United States Patent
Lipscomb

(10) Patent No.: US 7,936,319 B2
(45) Date of Patent: May 3, 2011

(54) ZERO-LAG IMAGE RESPONSE TO PILOT HEAD MOUNTED DISPLAY CONTROL

(75) Inventor: Derrell Lipscomb, Ipswich (GB)

(73) Assignee: Lockheed Martin Corporation, Bethesda, MD (US)

( * ) Notice: Subject to any disclaimer, the term of this patent is extended or adjusted under 35 U.S.C. 154(b) by 1090 days.

(21) Appl. No.: 11/715,334

(22) Filed: Mar. 8, 2007

(65) Prior Publication Data

US 2008/0218436 A1    Sep. 11, 2008

(51) Int. Cl.
*G09G 5/00* (2006.01)
*G06F 3/038* (2006.01)
*G02B 27/14* (2006.01)

(52) U.S. Cl. .............................. 345/9; 345/204; 359/630
(58) Field of Classification Search .................. 345/7–9, 345/204; 340/901; 359/618, 629, 630
See application file for complete search history.

(56) References Cited

U.S. PATENT DOCUMENTS

| 4,396,878 A | 8/1983 | Cole et al. |
| 5,438,361 A | 8/1995 | Coleman |
| 7,724,278 B2 * | 5/2010 | Maguire, Jr. ................. 348/121 |
| 2004/0183917 A1 | 9/2004 | von Flotow et al. |

* cited by examiner

*Primary Examiner* — Srilakshmi K Kumar
(74) *Attorney, Agent, or Firm* — Birch, Stewart, Kolasch & Birch, LLP

(57) ABSTRACT

A method and a system for tracking a line-of-sight (LOS) and providing zero-lag image response to a display is disclosed. The method according to one embodiment receives image data having a filed of view (FOV) that is larger than what is displayed on the display using an initial LOS, combines the received image data to create a region of interest (ROI) image, detects a change in the LOS, creates a new ROI image using the received image data to correspond to the changed LOS, and displays the new ROI image to the display.

17 Claims, 6 Drawing Sheets

ZERO-LAG IMAGE RESPONSE TO PILOT HEAD MOUNTED DISPLAY CONTROL

BACKGROUND OF THE INVENTION

Embodiments of the present invention generally relate to gimbal controlled video imagery, and more specifically, incorporating an electronic inner gimbal that works in conjunction with a mechanical outer gimbal of a video imagery device to provide substantially zero-lag image response to a display of the device.

Substantially zero-lag image response is especially helpful in close-in combat situations requiring fast movements and situational awareness. Gimbal controlled video imagery inherently suffers a lag in response due to the required mechanical movement and re-stabilization of line of sight (LOS) of the device.

In the past, various approaches have been tried to improve the ability to provide quick response to a head mounted display (HMD). One approach used by TADS/PNVS includes providing a floating mechanical inner gimbal that improves the response and stabilization of LOS of a Target Acquisition Designation Sight (TADS) system or a Pilot Night Vision Sensor (PNVS) system. This system provides excellent stabilization and adequate response to the HMD and was used for very successful system implementations. Other approaches for instantaneous response include the use of a staring array to form an "active" semi-hemispherical field of view (FOV). Although, this system may instantaneously follow a pilot's head movements to provide a high level of situational awareness, this technique can be problematic because the required FOV requires a relatively large number of detector/optic sets (e.g., 18) in addition to associated costly processing requirements. Another approach includes providing electronic image stabilization as used in some video camcorders. In a particular implementation, a vibration type gyroscope sensor has been provided with camcorders to establish automatic image stabilization. Although this system may be operable in the pitch and yaw directions, it becomes more problematic when this system utilizes a method of altering the clocking sequence to have access to the timing signal of the detector. Thus, this system limits the ability to provide a remote camera to a pilot using a head mounted display. A somewhat similar configuration is described in U.S. Pat. No. 5,438,361 but with distinct differences. The referenced invention focuses on the image stabilization aspect of using an inner electronic gimbal for fine adjustments and stabilization of imagery. While this invention also uses a similar configuration, it differs greatly and bridges the gap between the referenced invention and that of a Staring Array configuration. This invention applies a very wide field of view optic camera image that is much larger than the field of view sent to the operator's display. This much wider field of view allows for large electronic adjustments made near instantaneously and aligning with input commands. The focus of this invention isn't on stabilization (although that is required), but instead on the ability in incorporate image rapid movements over wide angles with no image response lag. This is achieved with a Staring Array configuration but such configurations are impractical to implement for high resolution imaging systems. In addition, this invention provides the capability for incorporating a form of peripheral vision using the information that exists within the camera FOV that lies outside the display FOV.

What is therefore needed is an alternative and more practical solution as compared with a staring array and image stabilization system of the prior art in a simple and cost effective manner to provide substantially zero-leg image response to a display.

SUMMARY OF THE INVENTION

Accordingly, embodiments of the present invention are directed to provide a single high resolution camera (focal plane array) or a grouping of relatively limited number (e.g., two to four) lower resolution cameras to provide an "active" FOV that is larger than what is displayed on a pilot's head mounted display. More particularly, the inner FOV would move within the camera's array in a way similar to that of the staring array concept except on a smaller scale. Further, by hybridizing an electronic inner gimbal with a mechanical servo system, it is possible to gain much of the response speed and electronic stabilization capability of the staring array without its extreme electronic complexity.

One embodiment of the present invention is directed to tracking a line-of-sight (LOS) of a target and displaying the images of the target to a pilot using a head mounted display. This embodiment features receiving image data having a filed of view (FOV) that is larger than what is displayed on a display using an initial LOS, combining the received image data to create a region of interest (ROI) image, detecting a change in the LOS, creating a new ROI image using the received image data to correspond to said changed LOS, and displaying said new ROI image to the display.

Another embodiment of the invention is directed to a system for tracking a line-of-sight (LOS) of a target and displaying the images of the target to a pilot using a head mounted display. This embodiment features at least an electronic gimbal unit including a plurality of image sensors for receiving a plurality of images using an initial line of sight (LOS), a processor configured to combine the received images to create a region of interest (ROI) image, and a detector configured to sense a change in the LOS, wherein the processor creates a new ROI image using the received images to correspond to the changed LOS.

Yet another embodiment of the invention is directed to providing substantially zero-lag image response to a pilot using a head mounted display. This embodiment features receiving a plurality of images using an initial line-of-sight (LOS), combining the received images to create a region of interest (ROI) image, detecting a change in the LOS, creating a new ROI image using the received images to correspond to the changed LOS, and displaying the new ROI image to the display.

Another embodiment is directed to a system for providing substantially zero-lag image response to a pilot using a head mounted display. This embodiment features at least an electronic gimbal unit including a plurality of image sensors for receiving image data having a filed of view (FOV) that is larger than what is displayed on a display using an initial line of sight (LOS), a processor configured to combine the received image data to create a region of interest (ROI) image, and a detector configured to sense a change in the LOS, wherein the processor creates a new ROI image using the received image data to correspond to the changed LOS.

Additional features of embodiments of the invention will be set forth in the description which follow, and in part will be apparent from the description, or can be learned by practice of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

The following detailed description of the embodiments of the invention refers to the accompanying drawings. The following detailed description does not limit the invention. Instead, the scope of the invention is defined by the appended claims and equivalents thereof.

Figure 1:
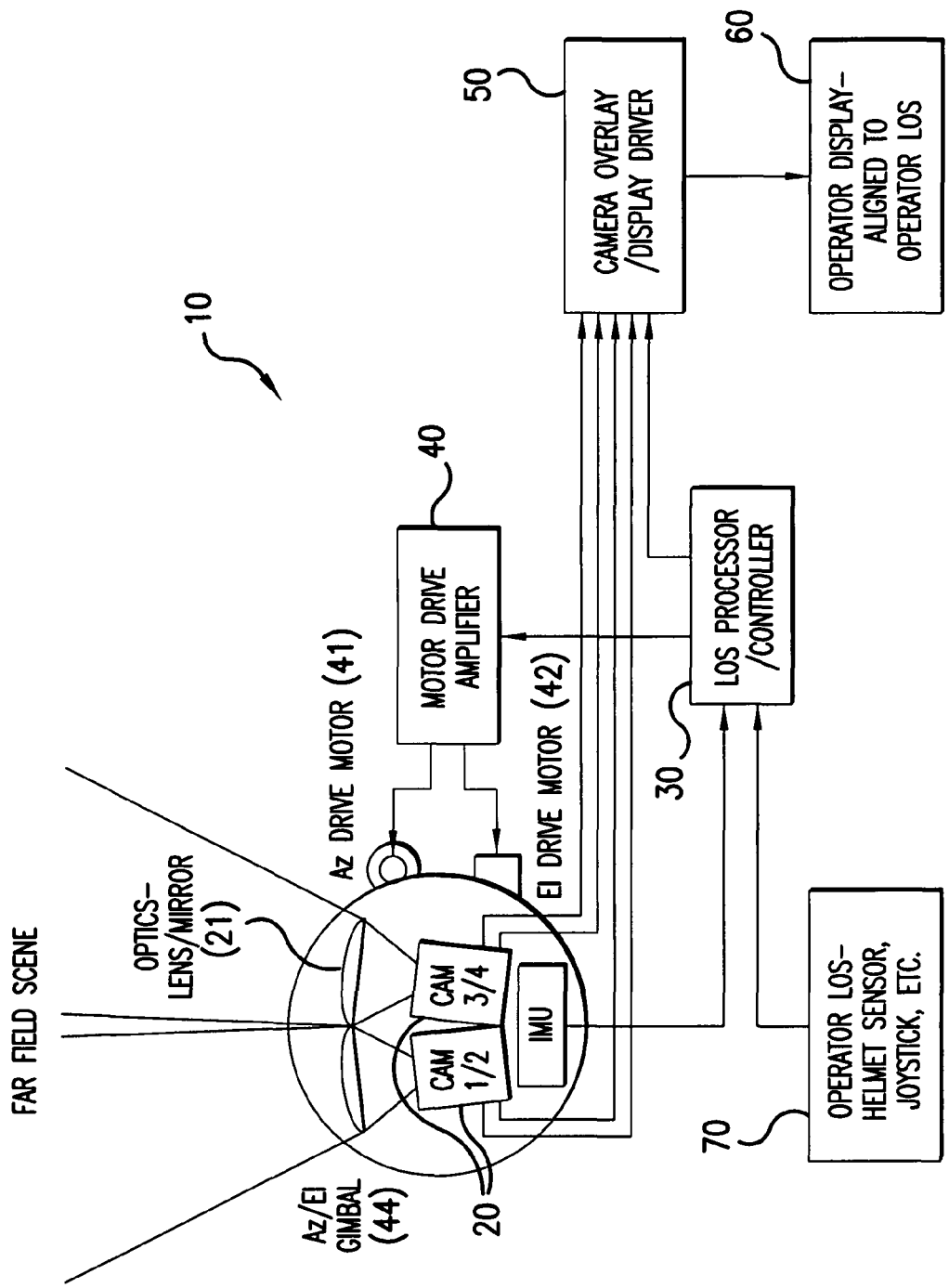
FIG. 1 depicts an exemplary system for tracking a LOS of a target and providing substantially zero-lag image response regarding the target to a pilot using a head mounted display consistent with an embodiment of the invention.

FIG. 1 depicts a system 10 for tracking a LOS of a target and providing substantially zero-lag image response to a pilot using a head mounted display consistent with an embodiment of the invention. The system 10 includes an electronic inner gimbal unit 20, optic lens/mirror 21, a LOS processor/controller 30, a motor drive amplifier 40, an azimuth drive motor 41, an elevation drive motor 42, an inertial measurement unit (IMU) 43, a camera overlay/display driver 50, an operator display unit 60, and an operator LOS unit 70.

In accordance with an exemplary embodiment of the present invention, one end of the electronic gimbal unit 20 is connected with the camera overlay/display driver 50 and the other end of the electronic inner gimbal unit 20 is connected with the optics-lens/mirror 21. The IMU 43 and the operator LOS unit 70 are both connected at the same side of the LOS processor/controller 30 wherein the other side of the LOS processor/controller 30 is connected with the motor drive amplifier 40 and the camera overlay/display driver 50. The camera overlay/display driver 50 is also connected with the operator display unit 60. The motor drive amplifier 40 is connected with the azimuth drive motor 41 and the elevation drive motor 42. The azimuth (AZ) drive motor 41, the elevation (EL) drive motor 42, and the IMU 43 together form an AZ/EL mechanical outer gimbal unit 44.

Consistent with an exemplary embodiment of the invention, the electronic inner gimbal unit 20 includes four cameras 1, 2, 3, and 4 which output image data and input such image data to the camera overlay/display driver 50. However, more or fewer cameras could be used in accordance with the invention. The LOS processor/controller 30 receives inputs from the IMU 43 and the operator LOS unit 70 and outputs to the motor drive amplifier 40 and the camera overlay/display driver 50. The motor drive amplifier 40 outputs data regarding shift or change in LOS of a target to the azimuth drive motor 41 and the elevation drive motor 42. The camera overlay/display driver 50 outputs image information regarding the LOS of the target to the operator display unit 60.

Consistent with an exemplary embodiment, the four cameras 1, 2, 3, 4 of the electronic inner gimbal unit 20 work in conjunction with the optics-lens/mirror 21 to provide far field scene described below with regard to FIG. 2.

Figure 2:
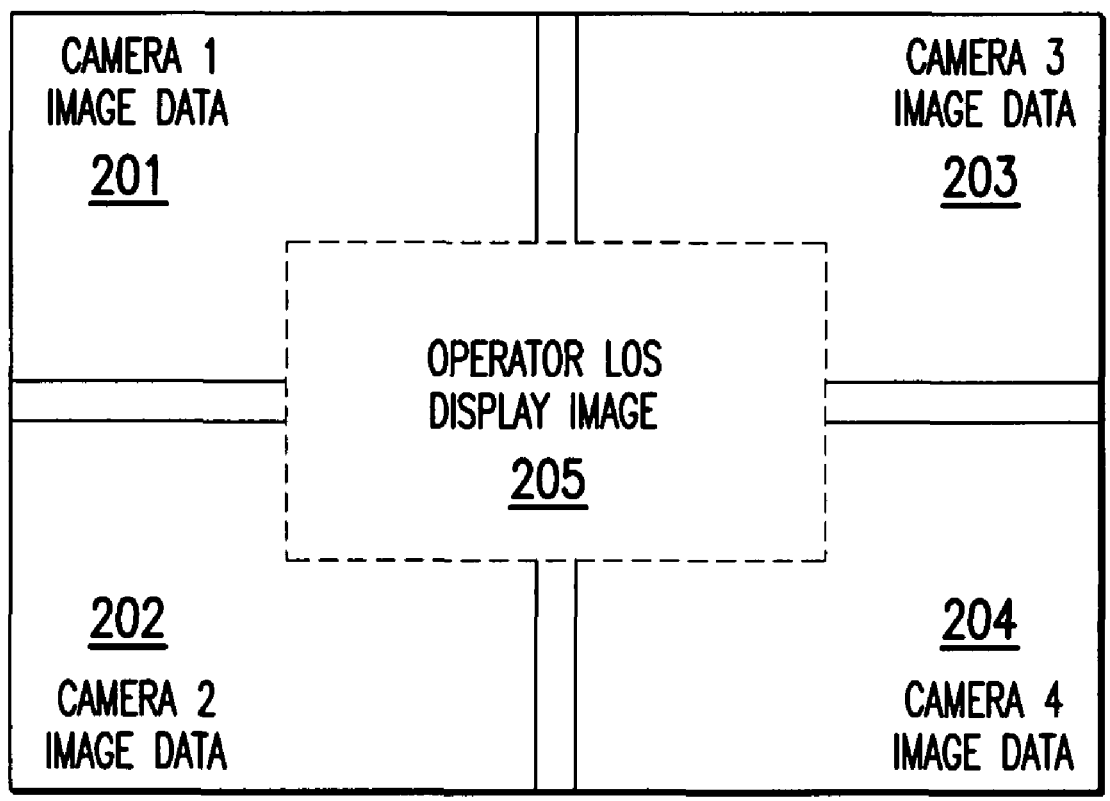
FIG. 2 depicts a ROI image consistent with the embodiment shown in FIG. 1.

FIG. 2 depicts a far field scene provided by the four cameras which represents a gimbal field of view (FOV). Camera 1 outputs image data 201, camera 2 outputs image data 202, camera 3 outputs image data 203, and camera 4 outputs image data 204. The gimbal FOV is comprised of image data 201, 202, 203 and 204. In this exemplary embodiment, each image data represents a quarter of the entire gimbal FOV. The operator display image 205 is smaller than the gimbal FOV. The operator display image 205 corresponds to the ROI image. The operator display image 205 can float around and respond substantially instantly to the operator LOS unit 70. For example, if an operator turns her head to the right, the operator display image 205 can instantly move to the right of the gimbal FOV to collect image data already provided by the four cameras.

The four cameras shown in FIG. 2 have a slight overlay where the images tie together. If each camera has a 6×4 degree FOV, then the four cameras combined would have slightly less than 12×8 degree FOV.

According to an embodiment of the invention, the LOS processor/controller 30 receives outputs from the operator LOS unit 70 and the IMU 43. The operator LOS unit 70 may include helmet sensor, joystick, or any other input device suitable for providing two-dimensional input of a desired LOS. Based on the received outputs, the LOS processor/controller 30 computes the relative LOS including azimuth and elevation information and sends the relative LOS to the camera overlay/display driver 50 and the motor drive amplifier 40.

The camera overlay/display driver 50 digitally combines the images outputted by the four cameras 1, 2, 3, and 4, and takes the relative LOS input from the LOS processor/controller 30. The operator display 60 receives output from the camera overlay/display driver 50.

The motor drive amplifier 40 receives the relative LOS input outputted from the LOS processor/controller 30 and computes the AZ/EL drive requirements to vector the gimbal toward substantially zero relative LOS position (position that corresponds to the camera/optic central LOS without any electronic offset) and sends signals to the AZ drive motor 41 and the EL drive motor 42 as required.

Figure 3:
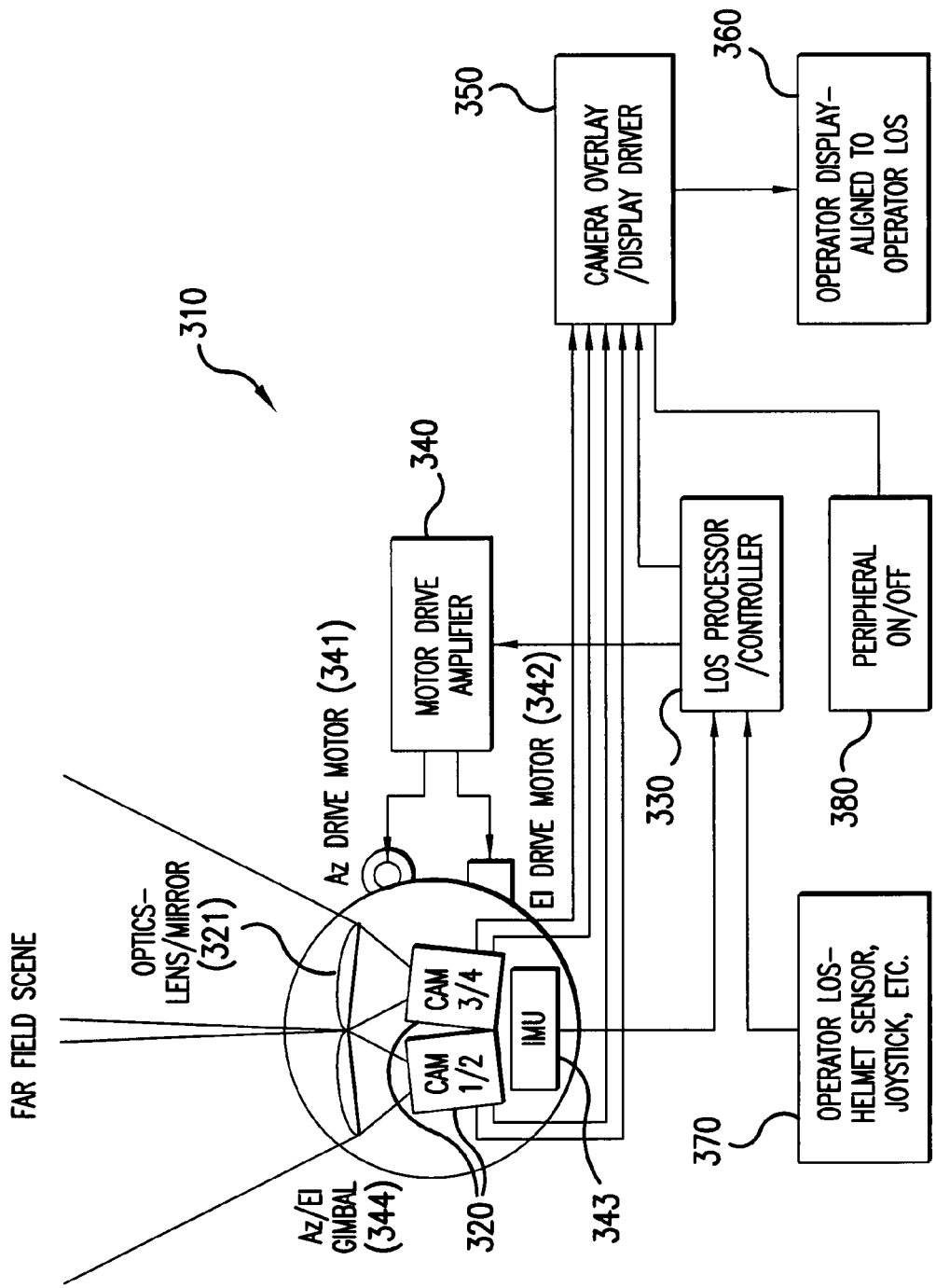
FIG. 3 depicts an exemplary system for tracking a LOS of a target and providing substantially zero-lag image response to the display consistent with another embodiment of the invention.

FIG. 3 depicts a system 310 for tracking a LOS and providing substantially zero-lag image response to a pilot using a head mounted display consistent with another embodiment of the invention. The system 310 includes an electronic inner gimbal unit 320, optic lens/mirror 321, a LOS processor/controller 330, a motor drive amplifier 340, an azimuth drive motor 341, an elevation drive motor 342, an inertial measurement unit (IMU) 343, a camera overlay/display driver 350, an operator display unit 360, an operator LOS unit 370, and a peripheral on/off switch 380. The electronic inner gimbal unit 320 includes four cameras 1, 2, 3, 4 which work in conjunction with the optics-lens/mirror 321 to provide far field scene described in FIG. 4 below. However, more or fewer cameras could be used in accordance with the invention.

In accordance with an exemplary embodiment of the present invention, one end of the electronic gimbal unit 320 is connected with the camera overlay/display driver 350 and the other end of the electronic inner gimbal unit 320 is connected with the optics-lens/mirror 321. The IMU 343 and the operator LOS unit 370 are both connected at the same side of the LOS processor/controller 330 wherein the other side of the LOS processor/controller 330 is connected with the motor drive amplifier 340 and the camera overlay/display driver 350. The camera overlay/display driver 350 is also connected with the operator display unit 360. The motor drive amplifier 340 is connected with the azimuth drive motor 341 and the elevation drive motor 342. The azimuth (AZ) drive motor 341, the elevation (EL) drive motor 342, and the IMU 343 together form an AZ/EL mechanical outer gimbal unit 344. The peripheral on/off switch 380 is connected with the camera overlay/display driver 350.

Consistent with an exemplary embodiment of the invention, the electronic inner gimbal unit 320 includes four cameras 1, 2, 3, and 4 which output image data and input such image data to the camera overlay/display driver 350. However, more or fewer cameras could be used in accordance with the invention. The LOS processor/controller 330 receives inputs from the IMU 343 and the operator LOS unit 370 and outputs to the motor drive amplifier 340 and the camera overlay/display driver 350. The motor drive amplifier 340 outputs data regarding shift or change in LOS of a target to the azimuth drive motor 341 and the elevation drive motor 342. The camera overlay/display driver 350 outputs image information regarding the LOS of the target to the operator display unit 360. When the peripheral on/off switch 380 is in "on" position, it outputs image data to the camera overlay/display driver 350.

Figure 4:
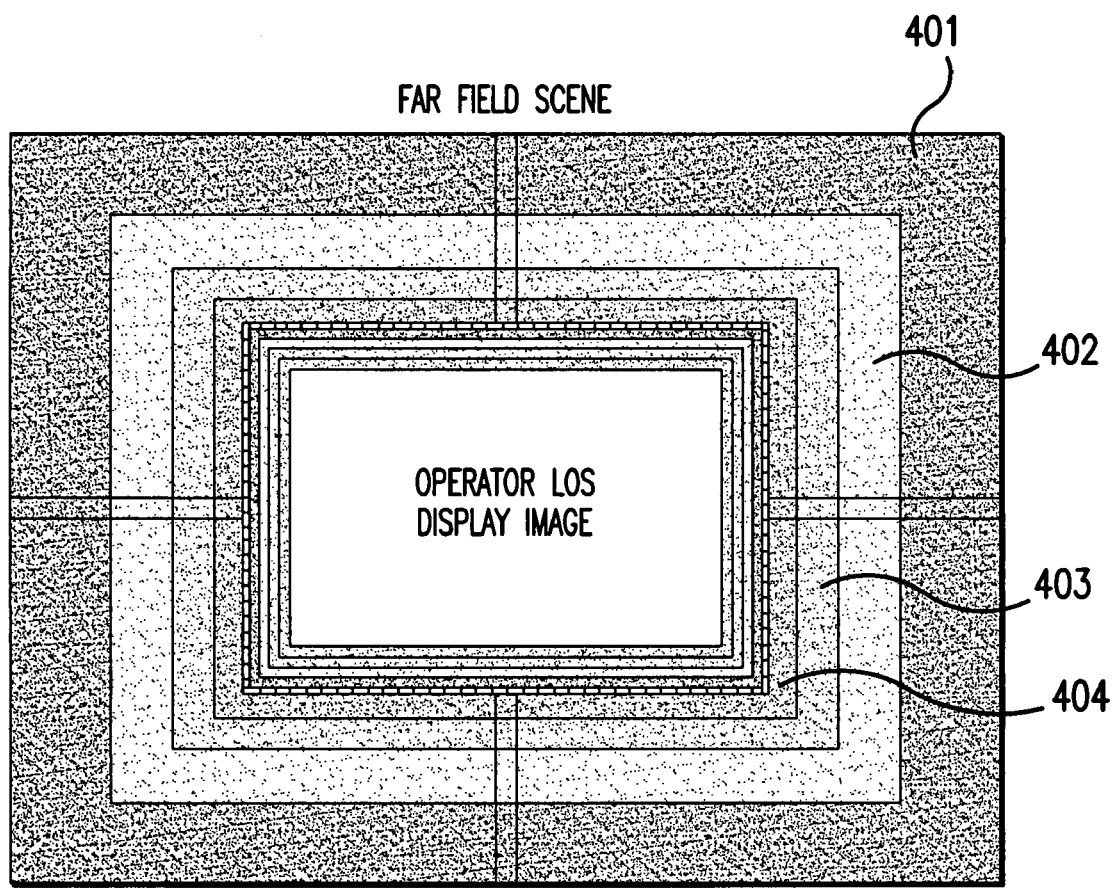
FIG. 4 depicts a ROI image consistent with the embodiment shown in FIG. 3.

FIG. 4 depicts a far field scene provided by the four cameras which represents the gimbal field of view (FOV). Camera 1 outputs image data 401, camera 2 outputs image data 402, camera 3 outputs image data 403, and camera 4 outputs image data 404. The gimbal FOV is comprised of image data 401, 402, 403 and 404. The operator display image 405 is smaller than the gimbal FOV. The operator display image 405 corresponds to ROI image. The peripheral area outside the FOV sent to the operator's display can be compressed and added to the operator's display as a peripheral ring of lower resolution imagery.

The peripheral area of the image data provided by the cameras is not displayed on the operator display image 405 when the peripheral on/off switch 380 is "off". However, when the peripheral on/off switch is "on", the peripheral area of the image data will be available to the operator as a low resolution image or gradient resolution ring of imagery (on the sides, top & bottom of the displayed imagery), which is similar to how the human eye functions. The outer data, instead of being discarded, could be provided to the operator as peripheral information. With this activated for instance, a bright object or other visual cue in the sensor area (but in the peripheral area and outside the display FOV) would be electronically pushed into the displayed area and show up as an outer perimeter ring of lowered resolution imagery on the sides, top and bottom. The operator, cued in by the bright area showing up in a peripheral area, can shift his LOS slightly and see the object in high resolution in the central area of the display.

According to an embodiment of the invention, the LOS processor/controller 330 receives outputs from the operator LOS unit 370 and the IMU 343. The operator LOS unit 370 may include helmet sensor, joystick, etc. Based on the received outputs, the LOS processor/controller 330 computes the relative LOS including the azimuth (AZ) and elevation (EL) information and sends the relative LOS to the camera overlay/display driver 350 and the motor drive amplifier 340.

The camera overlay/display driver 350 digitally combines the images outputted by the four cameras 1, 2, 3, and 4, and takes the relative LOS input from the LOS processor/controller 330. The operator display 360 receives output from the camera overlay/display driver 350.

The motor drive amplifier 340 receives the relative LOS input outputted from the LOS processor/controller 330 and computes the AZ/EL drive requirements to vector the gimbal toward the zero relative LOS position and sends signals to the AZ drive motor 341 and the EL drive motor 342 as required.

Figure 5:
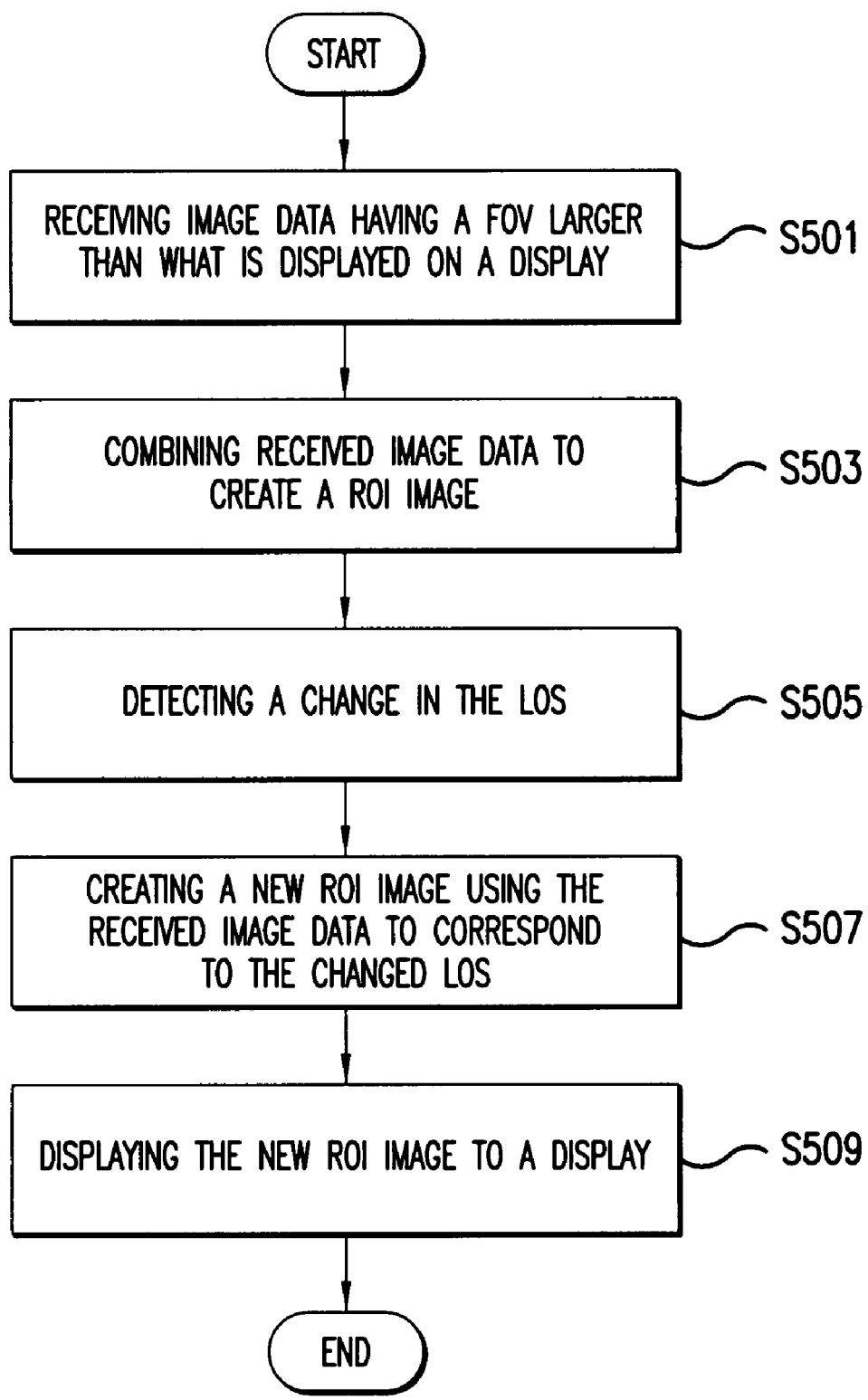
FIG. 5 depicts a flow diagram illustrating operations performed by a system for tracking a LOS of a target and providing substantially zero-lag image response regarding the target to a pilot using a head mounted display consistent with an embodiment of the invention illustrated in FIG. 1.

FIG. 5 depicts a flow diagram illustrating operations performed by the system for tracking a LOS and providing substantially zero-lag image response consistent with an embodiment of the invention illustrated in FIG. 1. This embodiment features receiving (S501) image data having a FOV that is larger than what is displayed on the operator display 60 using an initial LOS, combining (S503) the received image data to create a ROI image, detecting (S505) a change in the LOS, creating (S507) a new ROI image using the received image data to correspond to the changed LOS, and displaying (S509) the new ROI image to the operator display 60.

Figure 6:
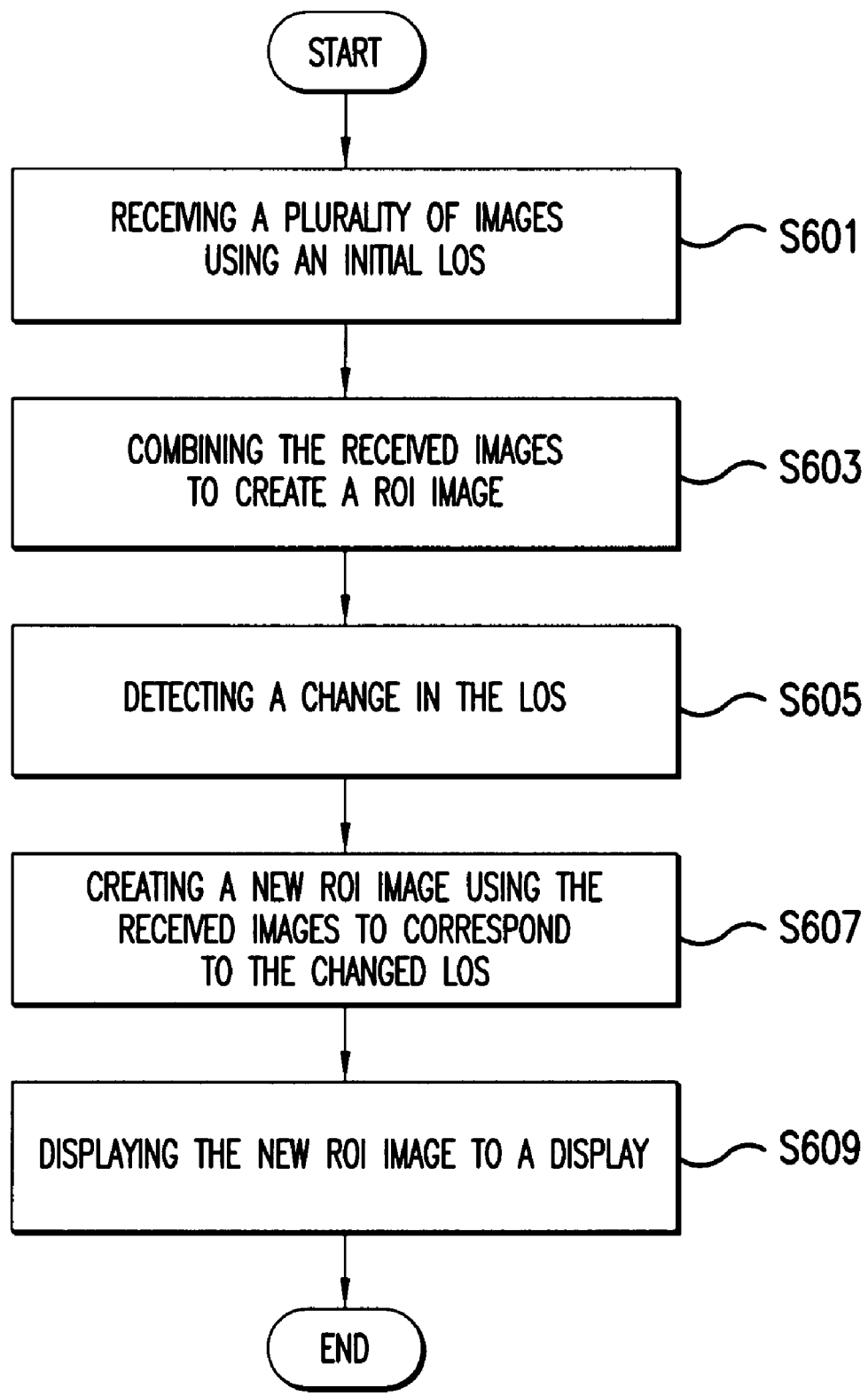
FIG. 6 depicts a flow diagram illustrating operations performed by a system for a LOS of a target and providing substantially zero-lag image response regarding the target to a pilot using a head mounted display consistent with an embodiment of the invention illustrated in FIG. 3.

FIG. 6 depicts a flow diagram illustrating other operations performed by the system for tracking a LOS and providing substantially zero-lag image response consistent with an embodiment of the invention illustrated in FIG. 3. This embodiment features receiving (S601) a plurality of images using an initial LOS, combining (S603) the received images to create a ROI image, detecting (S605) a change in the LOS, creating (S607) a new ROI image using the received images to correspond to the changed LOS, and displaying (S609) the new ROI image to the operator display 60.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A method for tracking a line-of-sight (LOS) of a target and displaying images of the target to a pilot using a head mounted display, comprising:
  receiving image data composed of subset of images from a field of view (FOV) that is larger than what is displayed on a display using an initial LOS;
  focusing said subset of images within an inner FOV to create a region of interest (ROI) image;
  detecting a change in the LOS;
  simultaneously creating a new ROI image in response to said change in the LOS using portions of said subset of images within the inner FOV that correspond to said changed LOS; and
  displaying said new ROI image to said display.

2. The method according to claim 1 further comprising:
  sensing a change in the LOS;
  providing the change in the LOS to create the new ROI image;
  creating a new image data based upon the changed LOS.

3. The method according to claim 1 further comprising: digitally combining said received image data to create said ROI image.

4. The method according to claim 1, further comprising: providing a plurality of peripheral image sensors for receiving a plurality of peripheral images; compressing said peripheral images to provide a low resolution imagery; and displaying said low resolution imagery around the perimeter of the display.

5. A method for providing substantially zero-lag image response to a pilot using a head mounted display, comprising:

receiving a plurality of images composed of subset of images from a field of view (FOV) using an initial line-of-sight (LOS);

focusing said subset of images within an inner FOV to create a region of interest (ROI) image;

detecting a change in the LOS;

simultaneously creating a new ROI image in response to said change in the LOS using portions of said subset of images within the inner FOV that correspond to said changed LOS; and displaying the new ROI image to said display.

6. The method according to claim 5 further comprising: sensing a change in the LOS;

providing the change in the LOS to create the new ROI image;

creating a new plurality of images based upon the changed LOS.

7. The method according to claim 5 further comprising: providing an active field of view (FOV) that is larger than what is displayed on said display.

8. The method according to claim 5 further comprising: digitally combining said received images to create said ROI image.

9. The method according to claim 5, further comprising: providing a plurality of peripheral image sensors for receiving a plurality of peripheral images; compressing said peripheral images to provide a low resolution imagery; and displaying said low resolution imagery around the perimeter of the display.

10. A system for providing substantially zero-lag image response to a pilot using a head mounted display, comprising:
    an electronic gimbal unit including a plurality of image sensors for receiving image data composed of subset of images from a field of view (FOV) that is larger than what is displayed on a display using an initial line of sight (LOS);
    a processor configured to focus said subset of images within an inner FOV to create a region of interest (ROI) image; and
    a detector configured to sense a change in the LOS, wherein said processor simultaneously creates a new ROI image in response to said change in the LOS using portions of said subset of images within the inner FOV that correspond to said changed LOS.

11. The system according to claim 10, wherein said plurality of image sensors provides an active field of view (FOV) that is larger than what is displayed on said display.

12. The system according to claim 10, wherein said detector includes an inertial measuring unit.

13. The method according to claim 10, further comprising: a plurality of peripheral image sensors for receiving a plurality of peripheral images; means for compressing said peripheral images to provide a low resolution imagery, wherein said low resolution imagery is displayed around the perimeter of said display.

14. A system for tracking a line-of-sight (LOS) of a target and displaying images of the target to a pilot using a head mounted display, comprising:
    an electronic gimbal unit including a plurality of image sensors for receiving a plurality of images composed of subset of images from a field of view (FOV) using an initial line of sight (LOS);
    a processor configured to focus said subset of images within an inner FOV to create a region of interest (ROI) image; and
    a detector configured to sense a change in the LOS, wherein said processor simultaneously creates a new ROI image in response to said change using portions of said subset of images within the inner FOV that correspond to said changed LOS.

15. The system according to claim 14, wherein said plurality of image sensors provides an active field of view (FOV) that is larger than what is displayed on said display.

16. The system according to claim 14, wherein said detector includes an inertial measuring unit.

17. The method according to claim 14, further comprising: a plurality of peripheral image sensors for receiving a plurality of peripheral images; means for compressing said peripheral images to provide a low resolution imagery, wherein said low resolution imagery is displayed around the perimeter of said display.

* * * * *